Jan. 30, 1934.    J. W. LEIGHTON    1,945,403
SHOCK ELIMINATOR
Filed June 13, 1932
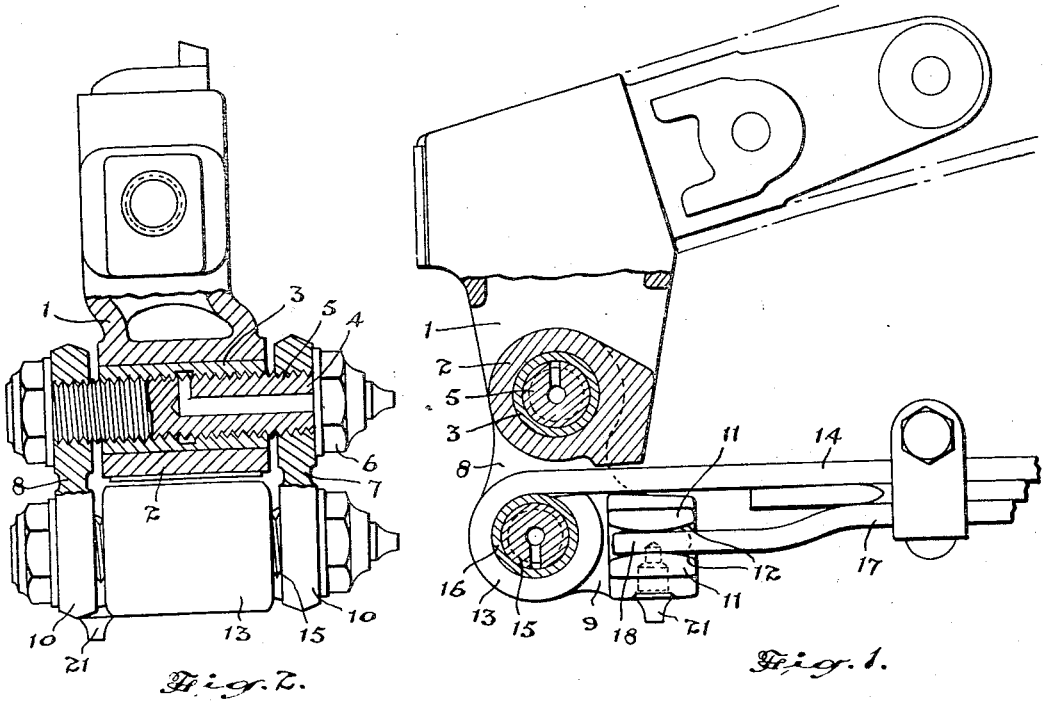
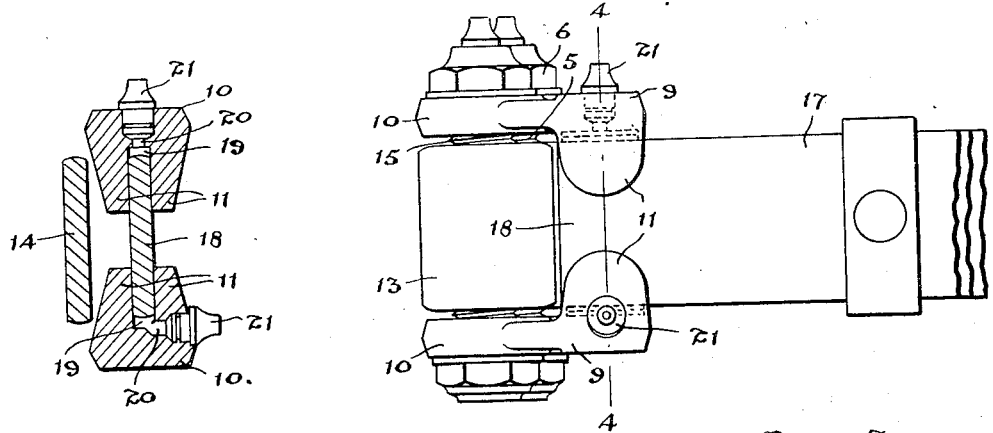
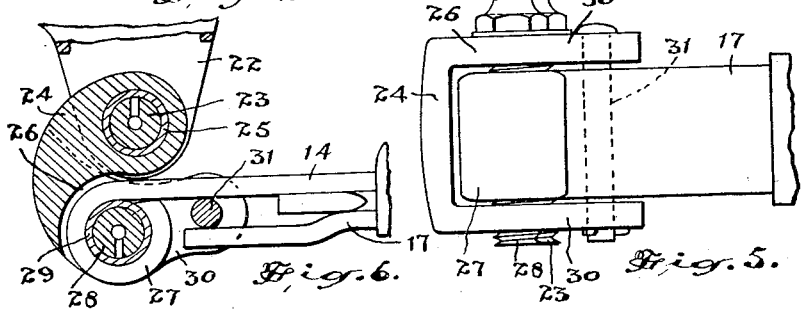
Inventor.
John Wycliffe Leighton.

Patented Jan. 30, 1934

1,945,403

UNITED STATES PATENT OFFICE 1,945,403

SHOCK ELIMINATOR

John Wycliffe Leighton, Port Huron, Mich.

Application June 13, 1932. Serial No. 616,772

10 Claims. (Cl. 267—54)

The principal objects of this invention are to control the oscillation of the end of a vehicle spring about a pivot support by means of an extremely simple and efficient attachment which may be easily secured in position and will be free from squeaks or rattles.

A further and important object is to utilize the car spring as the resilient controlling element of the shock eliminator.

The principal feature of the invention consists in the novel manner of restricting the oscillating or pivot action of the shackle connection at the end of the spring by means of a spring element which absorbs the oscillating movement, the said spring element being preferably a portion of the vehicle spring.

A further and important feature consists in the novel formation of the pivot shackle whereby a lever extension thereof engages a portion of said spring.

A still further feature of importance consists in mounting the lever shackles upon threaded shackle bolts having threaded bearing supports in the frame and spring ends.

In the accompanying drawing, Figure 1 is a side elevational part sectional view of a spring end equipped with my improved shock eliminator.

Figure 2 is an end elevational view partly in section of the assembly shown in Figure 1.

Figure 3 is an underside plan view.

Figure 4 is a cross section on the line 4—4 of Figure 3.

Figure 5 is an underside plan of a modified form.

Figure 6 is a longitudinal mid-section of the modified form.

Kick shackles, or spring end shock eliminators have been proposed and have been demonstrated to be extremely desirable in the equipment of motor vehicles to eliminate the transference to the frame and steering gear of the highly vibratory shocks imparted to the wheels in road travel.

In the construction herein shown the frame end bracket 1 is cast with a transverse boss 2 and the bearing bushing 3 therein is preferably formed with a threaded inner bearing surface 4 in which the threaded shackle bolt 5 is rotatably mounted.

The threads of the bolt 5 adjacent to the head 6 are preferably formed with an oversize pitch diameter and at the opposite end the pitch diameter is undersized and the shackle links 7 and 8 are threaded on to these end portions so as to be spaced from the ends of the bearing bushing.

The shackle links are formed right and left each with an angled extension 9 projecting substantially at right angles from the lower boss portion 10 and the extensions 9 are each formed with a pair of inwardly turned lugs 11, the adjacent faces 12 of which are cambered.

The eye end 13 of the upper spring leaf 14 of the front vehicle spring is spaced between the bosses 10 and a threaded bolt 15 similar to the bolt 4 is journalled in the threaded bushing 16 secured in the spring eye, the end threads of said bolt being secured in the bosses 10.

One of the leaves 17 of the main vehicle spring is formed with an extension end 18 which is preferably offset downwardly and said end extends between and engages the cambered surfaces of the lugs 11 of the shackle links.

Recesses 19 are formed between the base ends of each pair of lugs 11 to hold a felt lubricating pad which engages the edge of the spring end 18 and suitable oil ducts 20 and lubricating fittings 21 are arranged to supply said pads with a lubricant to lubricate the contacting surfaces of the spring and the lugs.

It will be readily seen that the comparatively rigid extension spring end 18 extending between the snugly engaging pairs of lugs 11 on each of the shackles, holds said shackles firmly but when a sudden endwise movement of the spring leaf 14 occurs, through the wheel of the vehicle engaging a bump of any kind, the shackles swing on their pivot support in the frame end and the lower shackle bolt 15 rotates in its bearing in the spring eye, the result being that the extension ends 9 are tilted upwardly. This upward movement is immediately checked by the spring extension 18 engaging the lugs 11 of the shackle links and the vibration which would otherwise be imparted to the vehicle frame is absorbed by the spring.

Any rebound action of the wheels following a shock such as described tends to force the spring eye in a forward direction and this causes the shackle links to swing forwardly but such movement is checked by the upper of the lugs 11 pressing downwardly on the spring extension 18 and the vibration is absorbed.

The provision of threaded bearings for the shackle links materially enhances the effectiveness of the shock absorbing element as all movements are free, there can be no binding of the shackles against the frame end or spring eye, consequently there will be no squeaking of rubbing surfaces.

The construction shown is extremely short coupled, that is to say, the lugs 11 are very close to the pivot centre in the spring eye, consequently there is the minimum amount of movement with the result that there will be practically no wear, especially in view of the fact that both the spring member 18 and the shackle lugs are of hardened metal.

The construction herein shown is extremely simple and compact and the use of one or more of the leaves of the main load carrying spring is desirable, but it must be understood that a flat leaf spring separate from the main spring may be utilized if desired. Further, while the threaded type of bearings for the shackle bolts is desirable, it will be readily appreciated that the shock absorbing feature may be used with the ordinary type of plain bearing.

Further it will be understood that the shackles may be joined together in a unitary element without departing from the principal feature of the use of a single spring element to check the pivotal movement of the shackles in either direction, and an example of such construction is illustrated in Figures 5 and 6.

In the construction shown in the latter figures the frame end is provided with a forked end 22 supporting the threaded bolt 23.

A block 24 provided with a threaded bearing bushing 25 is rotatably supported on the bolt 23 spaced between the sides of the fork end. The block 24 is formed with a fork end, the side lugs 26 of which span the spring eye 27 and are spaced therefrom, a threaded bolt 28 extending through said lugs and being journalled in a threaded bushing 29 in the spring eye.

Lugs 30 projecting in angular relation to the plane of the axes of the shackle bolts extend alongside of the spring 14 and a bolt 31 connecting the ends of the lugs 30 extends between the upper and intermediate spring leaves 32 and 33 respectively which maintain a constant tension on said bolt and the oscillating movement of the shackles is absorbed by said spring leaves.

What I claim as my invention is:—

1. A shock eliminator for vehicles, comprising an oscillatable forward front shackle operating in a substantially upright position and having a rigid lever extending rearwardly in substantially right angular relation to the upright portion and engaging the spring in close-coupled relation to and immediately rearward of the spring pivot to restrain the oscillations of the shackle.

2. A shock eliminator for vehicle springs comprising an oscillatable forward front shackle having a rigid rearward lever extension disposed in substantially right angular relation to the main shackle element and engaging both upper and lower surfaces of the spring at a point rearwardly of the spring pivot to restrain oscillation of the shackle in both directions, said shackle being operatively disposed in substantially right angular relation to the spring avoiding the application of undesired bending thrusts to the spring.

3. A shock eliminator as claimed in claim 2 in which the shackle lever extension has a contact portion engaging the underside of the main leaf spring and the upper side of a leaf extension.

4. A shock eliminator comprising the combination with a frame end and a spring end, of a rigid shackle member having one end pivotally mounted on the frame end and having its other end pivotally connected directly to the spring end and having a lever extension, and a flat spring engaged on its upper and lower sides by said lever extension to restrict the lever movement thereby checking the oscillatory movement of the shackle in both directions.

5. A shock eliminator as claimed in claim 4 having the shackle member formed of a pair of parallelly arranged angle-shaped links each having lug extensions engaging either side of the spring.

6. A shock eliminator as claimed in claim 4 having the shackle formed of two separate links each provided with a pair of lugs projecting laterally from the lever extensions, and bolts pivotally supporting said shackle links in rigid spaced relation, the paired lugs of each link embracing the edges of the flat spring.

7. A shock eliminator for vehicle springs comprising in combination, an oscillatable forward front shackle having a rigid lever extending rearwardly, and a load-supporting spring having a flat forward leaf extension terminating rearwardly of and in substantial horizontal alignment with the spring pivot, said flat forward leaf extension being engaged by the rearward lever extension in close coupled relation to and immediately rearward of the spring pivot to restrain oscillations of the shackle.

8. A shock eliminator as claimed in claim 4 in which one of the leaves of the load supporting spring is formed with an offset extension extending forwardly in spaced substantially parallel relation to the main leaf spring and having its free forward end engaged by the lever on the upper and lower surfaces.

9. A shock eliminator as claimed in claim 4 having the shackle formed with lubricating recesses adjacent to the edges of said spring and passages leading to said recesses.

10. In a shock eliminator the combination with the frame end and spring eye each having threaded bearings, threaded bolts journalled in said bearings, shackles secured on said bolts and spaced from said frame end and spring eye, said shackles having lever extensions, a flat spring having a free end extending between the lever extensions of said shackles, and means extending from said lever extensions engaging said spring and opposing oscillating movements of said shackle in either direction.

JOHN WYCLIFFE LEIGHTON.